United States Patent
Liou et al.

(10) Patent No.: US 6,708,888 B2
(45) Date of Patent: Mar. 23, 2004

(54) REFLECTION COWL FOR A BAR-CODE SCANNER

(76) Inventors: Kenneth Liou, 9F, No. 108-3, Min Chuan Rd., Hsin-Tien, Taipei Hsien (TW); Ting-Hao Hsiao, 9F, No. 108-3, Min Chuan Rd., Hsin-Tien, Taipei Hsien (TW)

( * ) Notice: Subject to any disclaimer, the term of this patent is extended or adjusted under 35 U.S.C. 154(b) by 162 days.

(21) Appl. No.: 09/995,584

(22) Filed: Nov. 29, 2001

(65) Prior Publication Data

US 2003/0098351 A1 May 29, 2003

(51) Int. Cl.[7] .................................................. G06K 7/10
(52) U.S. Cl. ............................ 235/462.45; 235/462.33; 235/462.36; 235/462.37; 235/462.4; 235/462.43
(58) Field of Search ..................... 235/462.33, 462.36, 235/462.37, 462.4, 462.43, 462.45, 462.34, 462.35, 454

(56) References Cited

U.S. PATENT DOCUMENTS 5,828,045 A * 10/1998 Bromse ...................... 235/455
6,085,981 A * 7/2000 Knowles et al. ....... 235/462.45
6,634,558 B1 * 10/2003 Patel et al. ............ 235/472.01

* cited by examiner

Primary Examiner—Michael G. Lee
Assistant Examiner—Kimberly Nguyen
(74) Attorney, Agent, or Firm—Rabin & Berdo, P.C.

(57) ABSTRACT

A reflection cowl for a bar-code scanner features that the light source wherein is a mono luminous element of light-emitting diode (LED) with a reflection cowl disposed in the rear aspect thereof, the reflection cowl is divided by the center line passed through the light source into a left and a right portions of reflection curved surfaces; respectively, the left and the right portions of the curved surfaces have a plurality of concaved reflection spherical surfaces thereon; all the reflection spherical surfaces have the function of distributing the light so as to make all the light rays reflected back from all the reflection spherical surfaces fall evenly on the convex light stick, thereby adjusting the curvature of the reflection cowl further adjusts the left and the right distribution areas of the reflected light, that means, evenly distributes the brightness at the center and on the side rim thereof.

6 Claims, 3 Drawing Sheets

REFLECTION COWL FOR A BAR-CODE SCANNER

BACKGROUND OF THE INVENTION

1) Field of the Invention

The present invention relates to a reflection cowl for a bar-code scanner, more especially, a bar-code scanner capable of not only obtaining a transversely linear scanning light ray with evenly left and right as well as better light ray intensity, but also saving the electric source and reducing the manufacturing cost.

2) Description of the Prior Art

Accordingly, all the hand-held scanner of the prior art comprises of a light source, a convex light stick, a lens, a sensor element and a circuit board; the light ray reflected for scanning has to be transverse linear light band for efficiently and precisely reflecting the image of the transverse bar-code to a sensor element for accomplishing the objective of reading the data. In order to obtain a transverse light band with consistent brightness at every position, usually more than two light sources are arranged in the rear aspect of the convex light stick for direct reflection; however, since this kind of structure has more than two luminous element of light-emitting diode (LED), it naturally increases the parts cost and electricity consumption; in addition, it tends to cause the problem of having uneven brightness on the left or the right portions, or in the central joint area of the light rays; that further influences the quality and economy of the product and really needs to be improved.

The inventor of the present invention, addressed the shortcomings of the abovementioned hand-held scanner of the prior art requiring more LED luminous elements, wasting the electric source, increasing the cost, the uneven intensity of the various portions of the light band, researched and developed discreetly as well as based on the experience gained from engaging in this industrial field for many years, finally invented a reflection cowl for bar-code scanner.

SUMMARY OF THE INVENTION

Therefore, the primary objective of the present invention is to provide a reflection cowl for a bar-code scanner to be disposed in the rear aspect of a light-emitting diode (LED) luminous element for reflecting two strands of light sources reflected through the convex light stick from the two sides of the said LED luminous element; additionally, the said distribution function of the reflected light distribute the reflected light source evenly on the convex light stick for further obtaining the best reflective effect of the transverse light band.

For achieving the above objectives, the present invention of a reflection cowl for a bar-code scanner comprises at least a light source, a convex light stick, a lens, a sensor element and a circuit board; the feature thereof is that the light source wherein is a luminous element of mono light-emitting diode (LED) with a reflection cowl disposed in the rear aspect thereof; the said reflection cowl is divided by the center line passed through the light source into a left and a right portions of reflection curved surfaces; respectively, the left and the right portions of the curved surfaces have a plurality of concaved reflection spherical surfaces; all the said reflection spherical surfaces have the function of distributing the light so as to make all the light rays reflected back from all the reflection spherical surfaces fall evenly on the convex light stick, thereby adjusting the curvature of the reflection cowl further adjusts the left and the right distribution areas of the reflected light, that means, evenly distributes the brightness at the center and on the side rim thereof.

Accordingly, the present invention has a LED luminous element disposed at the center in the rear aspect of the convex light stick to shine onto the reflection curved surfaces on the left and right portions of the reflection cowl; then a plurality of reflection spherical surfaces reflect evenly to the convex light stick for preventing the problem of having different brightness on the left and the right side rims and to reduce the problem of having uneven brightness of the light rays at the central joint area caused by the light source accomplished by more than two LED luminous elements and to save more electricity than the structure with multiple LED luminous elements of the prior art.

In order to enable a further understanding of the mentioned structure and effectiveness of the present invention, the brief description of the drawings below is followed by the detailed description of the preferred embodiment.

DETAILED DESCRIPTION OF THE PREFERRED EMBODIMENTS

Figure 1:
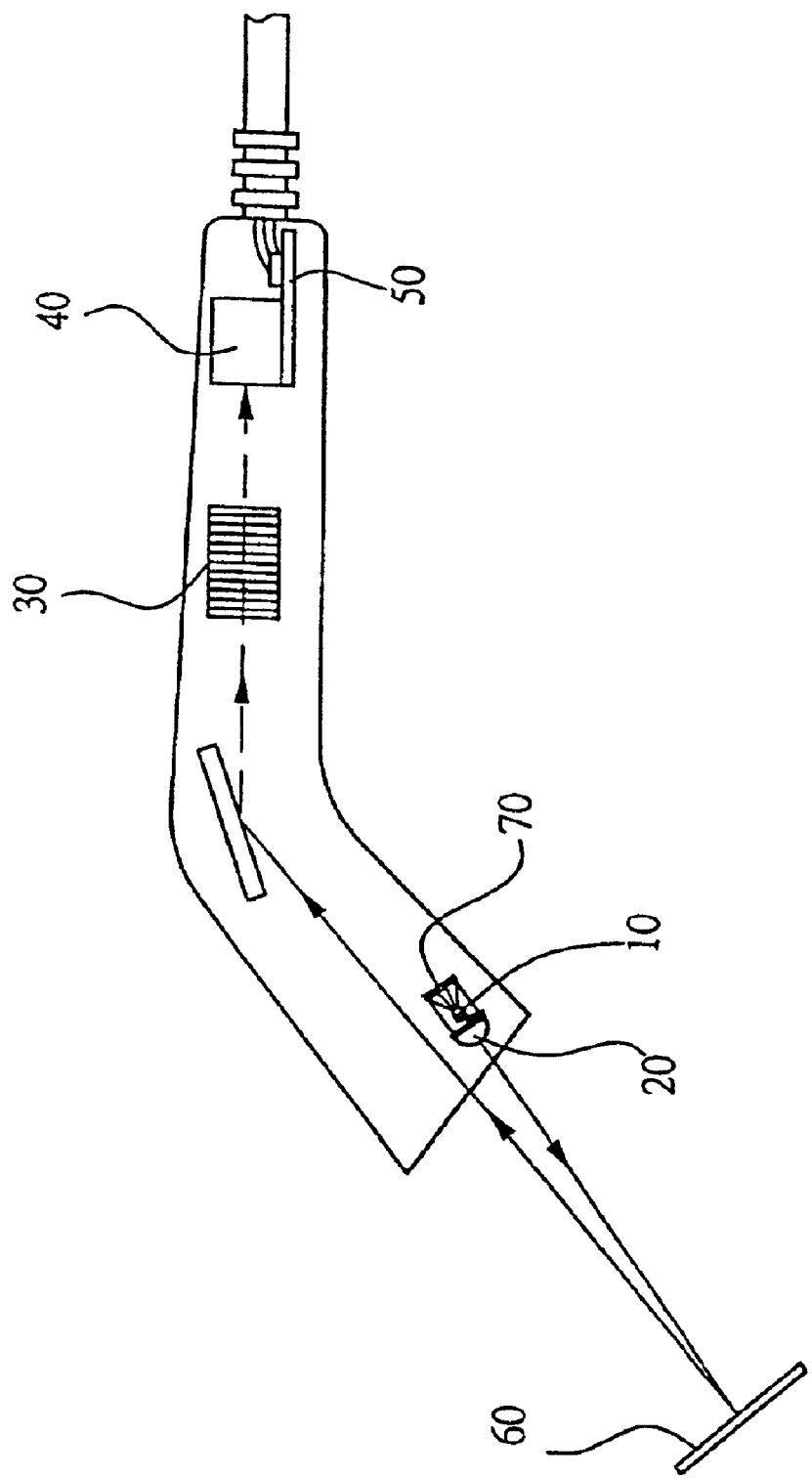
FIG. 1 is a schematic drawing of an entire scanner.

Referring to FIG. 1, the present invention of a reflection cowl for a bar-code scanner at least comprises a light source (10), a convex light stick (20), a lens (30), a sensor element (40) and a circuit board (50); when the scanning work is activated, the light source (10) emits the light rays, after being condensed by the convex light stick (20), a transversely long light band is formed; when the said light band shines on a bar-code label (60), the image of the said bar-code label (60) projects onto a sensor element (40) directly (or indirectly through a reflection mirror) through a lens (30) (including a fringe); the light signal, after being read and converted into digital signal by a sensor element (40), is transmitted outward through a circuit board (50) for use or for storage.

Figure 2:
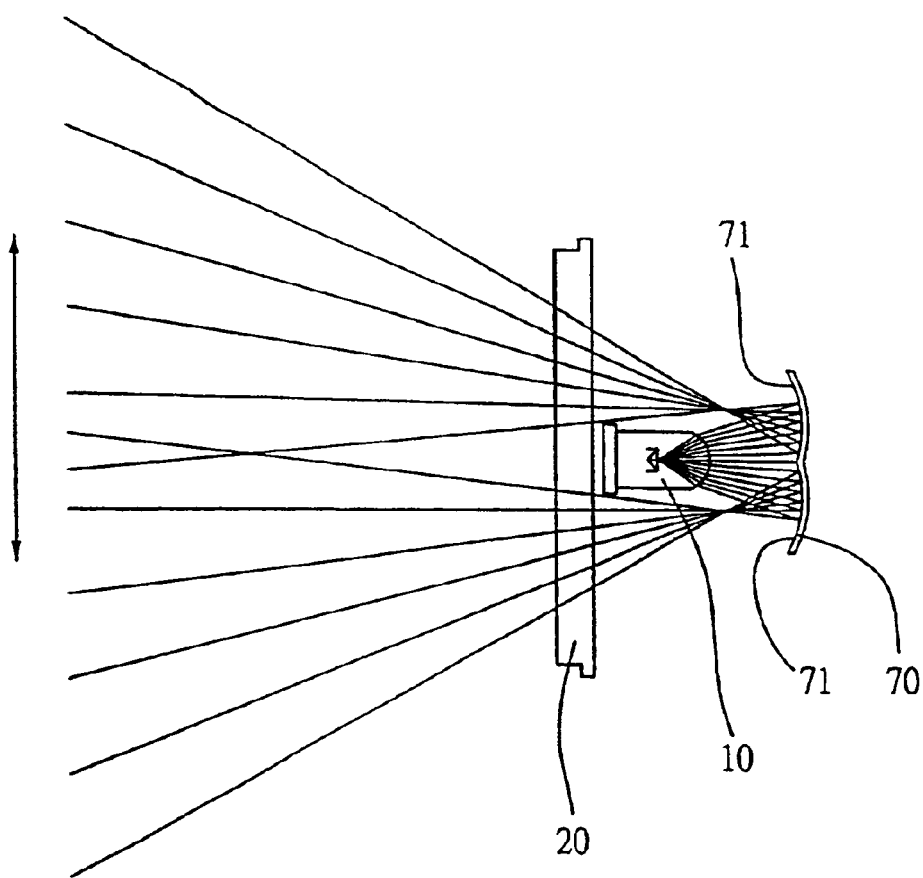
FIG. 2 is a top view drawing of an exemplary embodiment of a reflection cowl of the present invention.
Figure 3:
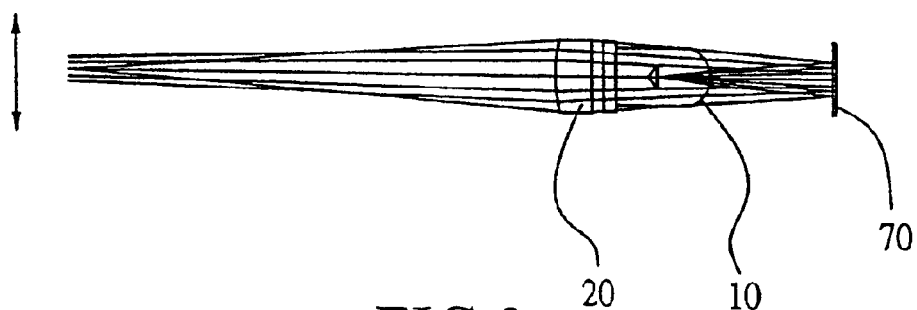
FIG. 3 is a lateral view drawing of an exemplary embodiment of a reflection cowl of the present invention.
Figure 4:
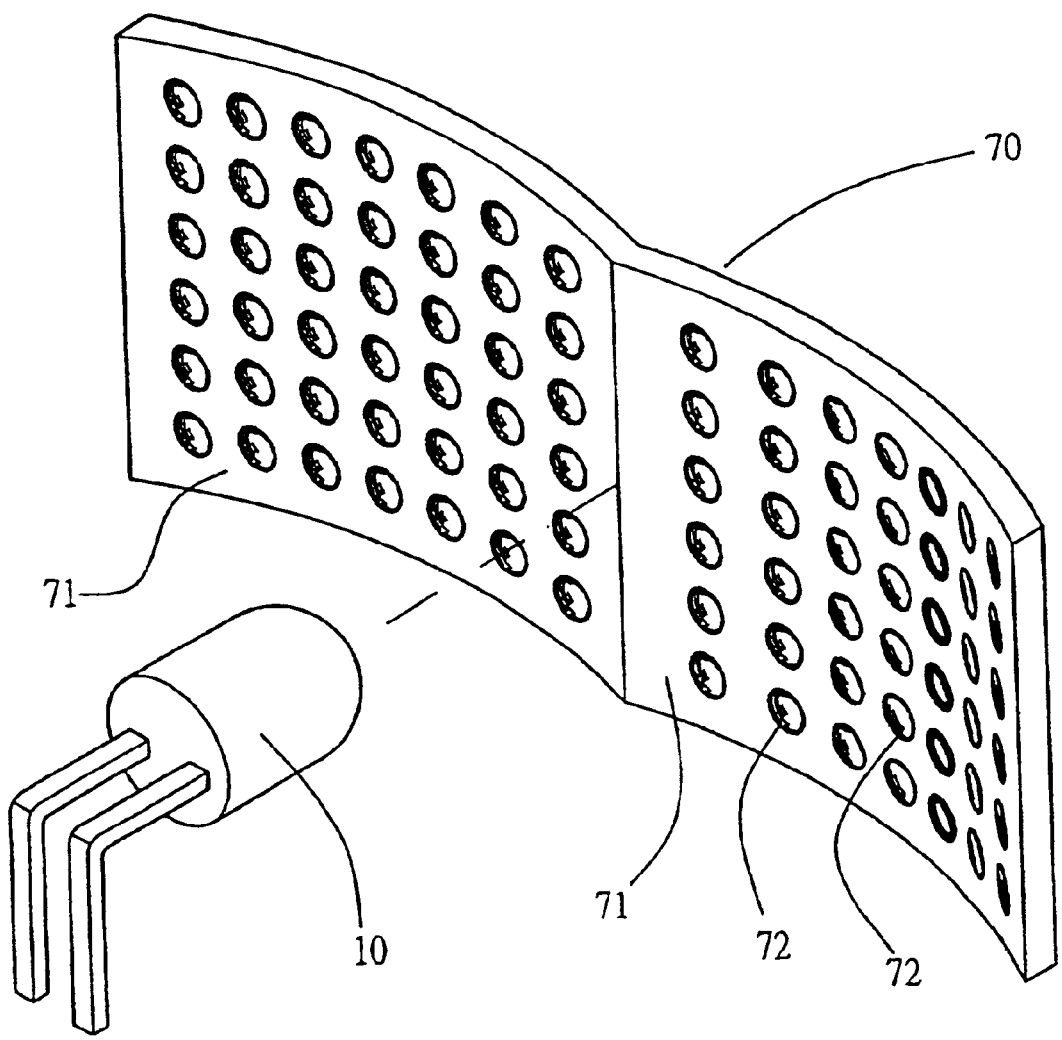
FIG. 4 is a pictorial drawing of the reflection cowl of the present invention.

Referring to FIGS. 2 and 3, the light source (10) of the present invention is a mono LED luminous element shining rearward; a reflection cowl (70) is disposed in the rear aspect of the said light source (10); the said reflection cowl (70) is divided by the center line passed through the light source (10) into a left and a right portions of reflection curved surfaces (71); respectively, the left and the right portions of the curved surfaces (71) have a plurality of concaved reflection spherical surfaces (72) thereon, as shown in FIG. 4; all the said reflection spherical surfaces (72) have the function of distributing the light so as to make all the light rays reflected back from all the reflection spherical surfaces (72) to fall evenly on the convex light stick (20), as shown in FIG. 2; then the convex light stick (20) condenses the light rays longitudinally, as shown in FIG. 3, to make the projected light beam a transversely long light band parallel to the convex light stick (20).

According to the mentioned structure, through adjusting the curvature of the reflection curved surfaces (71) on the two left and right proportions of the reflection cowl, the reflected light on every reflection spherical surfaces (72) can be adjusted to distribute evenly on the left and the right sides of the convex light stick (20) for further evenly distributing the brightness at the center and on the side rim thereof to achieve the best projective effect.

Accordingly, the light source (10) of the present invention can be obtained by disposing one LED luminous element at the center in the rear aspect to shine backward on to the reflection curved surfaces (71) on the left and the right portions of the reflection cowl (70), then to reflect on to the convex light stick (20) so as to eliminate the problem of having different brightness on the left and the right side rims, to reduce the problem of having uneven brightness of the light rays at the central joint area caused by the light source of multiple LED luminous elements of the prior art and to save more electricity than the prior art of multiple LED luminous elements, thereby to increase the industrial utilization value and practicality of the said product.

In summation of the foregoing sections, the present invention of a reflection cowl for a bar-code scanner is capable of specifically achieving the efficiency of saving the electricity, the cost and having an even illumination.

It is of course to be understood that the embodiment described herein is merely illustrative of the principles of the invention and that a wide variety of modifications thereto may be effected by persons skilled in the art without departing from the spirit and scope of the invention as set forth in the following claims.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A reflection cowl for a bar-code scanner, the scanner; comprising at least a light source, a convex light stick, a lens, a sensor element and a circuit board, wherein:

the reflection cowl is disposed to receive light emitted by the light source; the reflection cowl is divided into a left and right portions, the left and right portions having curved reflective surfaces; and the curved reflective surfaces of the left and the right portions of the reflection cowl have a plurality of concave reflection spherical surfaces thereon to distribute the light so as to make the light rays reflected back from all the curved reflection surfaces fall evenly on the convex light stick.

2. The reflection cowl for a bar-code scanner as claimed in claim 1, wherein the light source comprises a light-emitting diode.

3. The reflection cowl for a bar-code scanner as claimed in claim 1, wherein the light source comprises a mono luminous light-emitting diode.

4. The reflection cowl for a bar-code scanner as claimed in claim 1, wherein the reflection cowl is divided into the right and left portions thereof at a centerline, the center line of the reflection cowl being centrally located with respect to the light source.

5. The reflection cowl for a bar-code scanner as claimed in claim 4, wherein the light source comprises a light-emitting diode.

6. The reflection cowl for a bar-code scanner as claimed in claim 1, wherein the convex light stick receives light reflected by the reflection cowl and condenses the reflected light.

* * * * *